3,304,316
PHENYL MERCURY SALTS OF BRANCHED CHAIN ALIPHATIC MONOCARBOXYLIC ACIDS
John Geraci, Ridgefield, N.J., and Sergey V. Chodsky, New York, N.Y., assignors to Alcolac Chemical Corporation, a corporation of Maryland
No Drawing. Filed Feb. 8, 1965, Ser. No. 431,204
4 Claims. (Cl. 260—433)

This application is a continuation-in-part of our co-pending application, Serial No. 328,488, filed December 6, 1963.

The present invention relates to novel organic mercury compounds and to compositions containing the novel organic mercury compounds.

The bactericidal properties of organic mercurial compounds have long been known. However, these compounds are generally insoluble in most of the solvents normally used for the preparation of such liquid compositions as oil paints, varnishes and the like. Thus, the use of such organic mercury compounds as fungicides, mildewcides, etc. in such compositions is hampered by the difficulty encountered in effecting solvation of the bactericides.

The problem is suitably illustrated by the problems encountered in the use of phenyl mercury acetate. This organic mercury compound is soluble only to the extent of about 0.1% by weight in varnish-makers naphtha; only slightly more soluble in xylene and soluble to the extent of about 3.3% by weight in the monoethyl ether of ethylene glycol, 2-ethoxy ethanol.

In view of the low solubility of these compounds and the difficulties encountered by subsequent users in dissolving the salts, the compounds are commonly sold in the form of dilute solutions. Handling of such solutions, however, also presents problems including increased handling and freight costs. Further, to obtain a significant quantity of salts into a formulation, a large volume of solution is required; this may seriously dilute the formulation to an undesirable degree. In addition, the inventory of the supplier of such dilute solution is necessarily unduly voluminous.

Numerous attempts have been made to avoid these problems. Suggestions include the addition of solubilizing agents to the organic mercury salts. However, solubilizing agents may interfere with other compositions in the ultimate formulations, and tend to dilute the mercury content of the composition; thus greater quantities of the concentrated solution are required to attain a satisfactory mercury content in the final composition.

We have now found that novel phenyl mercury salts of branched chain saturated aliphatic carboxylic acids can be prepared. We have further found that the salts have exceptional solubility far exceeding the solubility of the corresponding straight chain compound containing the same number of carbons. We have further found that the novel salts may be introduced into various organic solvents and formulations in high concentrations while exhibiting biocidal activity which is at least equivalent to the biocidal activity of the corresponding straight chain compound.

In accordance with the present invention, the novel compounds may be defined as the phenyl mercury salts of branched chain aliphatic carboxylic acids which acids have a total of from 4 to 18 carbon atoms. Thus, the present invention contemplates salts such as phenyl mercuric isobutyrate, phenyl mercuric 14-ethyl hexadecanoate and 2-propyl pentadecanoate. The last two mentioned, for example, have a greatly increased solubility in organic solvents over that found in phenyl mercuric stearate. Similarly, the phenyl mercuric isobutyrate which has exceptional solubility in organic solvents exhibits solubility in organic solvents manyfold that found with phenyl mercuric butyrate. The most exceptional of all, however, in accordance with the present is phenyl mercuric 2-ethyl hexanoate. Not only does this compound retain all of the advantageous properties of phenyl mercuric octanoate, but its greatly enhanced solubility renders it usable for a multitude of purposes for which phenyl mercuric octanoate is not satisfactory.

The compounds of the present invention may be produced by mixing phenyl mercuric acetate with an alkali metal salt of a branched aliphatic carboxylic chain acid in an aqueous alkaline medium. The mixture is heated and agitated for several hours until a suspension of the phenyl mercuric salt of the branched chain acid forms. The suspended solids are then separated from the suspending medium and the solid product washed and dried.

It is possible to speed up the reaction and increase the reaction efficiency by the continuous removal from the alkaline medium of the product formed. This is readily accomplished by the methods well known to those skilled in the art. Further, as is known, not only will the reaction proceed more rapidly, but the reactants will be utilized more completely.

The chemical reaction mechanism is as follows: a suitable phenyl mercuric salt, such as phenyl mercuric acetate, is reacted with an alkali metal salt of the desired branched chain acid; an ester interchange-type reaction occurs to produce the desired branched chain phenyl mercuric salt and an alkali metal salt such as sodium acetate. For complete reaction, the alkali metal salt reactant should be present in about stoichiometric quantities. However, to increase the rate of reaction, amounts in excess of stoichiomtric are suitably employed. In general, it has been found to be particularly advantageous to utilize a mole ratio of alkali metal salt reactant to phenyl mercuric compound reactant of the order of about 1.25 to 1. The amount of alkali metal hydroxide dissolved in water to form the aqueous alkaline medium should also be such that the mole ratio of alkali metal hydroxide to phenyl mercuric compound reactant is about 1.25 to 1. It should be noted that as employed herein, the terms "alkali metal salt" and "alkaline metal hydroxide" are intended to include the corresponding ammonium compounds.

The alkali metal salt reactant may be formed in situ if desired. Thus, in addition to the alkaline medium, the reaction mixture can comprise phenyl mercuric salt, the desired branched chain aliphatic carboxylic acid and sufficient additional alkali metal hydroxide to form the desired alkali metal salt.

Temperatures and pressure are not critical, and the reaction may be performed at ambient temperature and pressure. However, to complete the reaction in the shortest period of time, the reaction should be conducted at temperatures just below the melting point of the final product. Thus, for phenyl mercuric 2-ethyl hexanoate, the temperature should be about 70° C. or lower.

Reaction times required for production of the novel phenyl mercuric compounds may vary considerably dependent upon the specific temperature chosen. In the case of preparation of the phenyl mercuric 2-ethyl hexanoate, the reaction time may vary from about 30 minutes up to about 15 or 20 hours. When the product is not removed during the reaction, it settles from the reaction mixtures as a crystalline solid and may be readily recovered by conventional separation methods, such as filtration, decantation, centrifugation and the like.

As was noted previously, phenyl mercuric 2-ethyl hexanoate is the preferred compound, although the isobutyrate also possesses exceptional properties. The former is a white, highly stable, crystalline material containing, by titrimetric analysis, about 47.5% by weight of mercury. The phenyl mercuric 2-ethyl hexanoate has been found to be soluble in a wide variety of organic solvents and water-containing solvent systems. Examples of these solvents include alcohols, chloroform, dioxane, acetone, naphtha, benzene, chlorinated hydrocarbons, aliphatic and aromatic hydrocarbons, aqueous ammonia, acetic acid and ammoniacal alcohol, and acetone and dioxane. The compound dissolves readily and forms a stable solution containing from about 10 to 50% by weight of phenyl mercuric 2-ethyl hexanoate in all of the above-mentioned solvents without the addition of any solubilizing agents. The compound is completely compatible with all of the above-mentioned solvents and solutions thereof can be made on both the alkaline or slightly acid side. Furthermore, all solutions have excellent stability and are useful in water-base or oil-base compositions for imparting bactericidal properties thereto.

The stability, high solubility, and excellent dispersibility of the phenyl mercuric compound of the present invention are very advantageous from a consumer standpoint. These attributes permit shipment of the compounds in the solid form and thus afford tremendous economic advantages over materials of the prior art.

Example 1

Fifty grams of sodium hydroxide (1.25 moles) were dissolved in 460 grams of water. To the resulting alkaline solution were added 180 grams of 2-ethyl hexoic acid (1.25 moles); the mixture was agitated at ambient temperature until complete dissolution occurred. The pH ranged from 6.8 to 7.0. The mixture was cooled to room temperature (20 to 25° C.) and one mole of phenyl mercuric acetate was added. The mixture was then agitated at ambient temperature for about three hours, following which the temperature was raised to about 40 to 45° C. and the mixture was agitated at that temperature for an additional three hours. During this period the product formed as a suspension of particles in the aqueous medium. The solids were separated by filtration, washed with water until free from sodium acetate and unreacted sodium 2-ethyl hexanoate and dried at 40 to 50° C. The white crystalline product contained, by analysis, 47.0% mercury; the theoretical mercury content is 47.66%. The melting point range of the white crystalline product was 71° to 74° C.

Example 2

Fifty grams of sodium hydroxide (1.25 moles) were dissolved in 460 grams of water. To the alkaline solution were added 180 grams of 2-ethyl hexoic acid (1.25 moles) and phenyl mercuric acetate (one mole) and the mixture was continually agitated and heated to about 75–85° C. The product was removed from the alkaline medium continuously as it formed and complete conversion was obtained. The crystallized product was washed with a low boiling hydrocarbon solvent to speed up drying of the product and to remove any residual odor. The product was then dried at 40–50° C. The product contained, by analysis, 47.3% mercury as compared to a theoretical content of 47.66%. The melting point range of the product was 79–81° C.

Example 3

The procedure of Example 1 was repeated using 1.25 moles of n-octanoic acid in place of the 2-ethyl hexoic acid. The phenyl mercuric n-octanoate product contained, by analysis, 46.9% mercury as compared to a theoretical content of 47.66%. The melting point range of the product was 77–80° C.

Example 4

The procedure of Example 1 was repeated using 1.25 moles of isobutyric acid in place of the 2-ethyl hexoic acid. The phenyl mercuric product contained, by analysis, 54.6% mercury as compared to the theoretical content of 54.99%. The melting point range of the product was 55–58° C.

Example 5

The procedure of Example 1 was repeated using 1.25 moles of n-butyric acid in place of the 2-ethyl hexoic acid. The phenyl mercuric n-butyrate product contained, by analysis, 54.2% mercury as compared to the theoretical content of 54.99%. The product had a melting point range of 85–89° C.

Example 6

The procedure of Example 2 was repeated using 1.25 moles of n-octanoic acid in place of the 2-ethyl hexoic acid. The phenyl mercuric n-octanoate product contains, by analysis, 47.2% mercury as compared to a theoretical content of 47.66%. The product had a melitng point range of 83–85° C.

Example 7

The procedure of Example 2 was repeated using 1.25 moles of isobutyric acid in place of the 2-ethyl hexoic acid. The phenyl mercuric isobutyrate product contained, by analysis, 54.6% mercury as compared to a theoretical content of 54.99%. The product had a melting point range of 55–58° C.

Example 8

The procedure of Example 2 was repeated using 1.25 moles of n-butyric acid in place of the 2-ethyl hexoic acid. The phenyl mercuric n-butyrate product contained, by analysis, 54.38% mercury as compared to the theoretical content of 54.99%. The product had a melting point range of 83–84° C.

The following examples are included to show the superiority of the solubility of the branched chain phenyl mercuric compounds in various solvents as compared to the homologous straight chain compounds.

Examples 9–11

Phenyl mercuric 2-ethyl hexanoate was dissolved at room temperature in methanol, acetone and naphtha. The solutions, which were slightly hazy, were filtered, analyzed for mercury, and the percent compound by weight was calculated. All three solutions remained stable at room temperature for a period of 40 days. Results are tabulated in Table I.

Examples 12 and 13

Phenyl mercuric 2-ethyl hexanoate was dissolved in propylene glycol and mineral spirits to prepare solutions of 25% by weight at 45° C. The solutions were filtered at room temperature and then allowed to stand at room temperature for several days. The solutions were refiltered to remove crystallized compounds present in the solution. The clear solutions were analyzed for mercury and the percent of phenyl-mercuric 2-ethyl hexanoate prsent was calculated. Both solutions were stable at room temperature for 40 days.

Examples 14–18

Phenyl mercuric n-octanoate was dissolved in methanol acetone, propylene glycol, naphtha, and mineral spirits to form solutions ranging from 20–33% by weight at temperatures from 60–80° C. The solutions were cooled to room temperature, filtered, allowed to remain standing at room temperature for several days, and then refiltered to remove crystallized compounds. The clear solutions were analyzed for mercury content and the percent phenyl mercuric n-octanoate was calculated. The percent solubility by weight of the phenyl mercuric n-octanoate for these five solutions is set forth in Table I. All five of the solutions were stable at room temperature for 40 days.

TABLE I.—PERCENT SOLUBILITY BY WEIGHT OF $C_8$ PHENYL MERCURIC SALTS

| Phenyl mercuric compounds | Methanol | Acetone | Propylene glycol | Naphtha | Mineral spirits |
|---|---|---|---|---|---|
| 2-ethyl hexanoate | 50.0 | 50.0 | 11.0 | 33.3 | 7.5 |
| n-Octanoate | 8.0 | 15.0 | 8.0 | 9.5 | 1.1 |

*Examples 19–21*

Phenyl mercuric isbutyrate was dissolved at room temperature in methanol, acetone and naphtha. These solutions were not allowed to stand for any period of time but were filtered and analyzed for mercury content, and the weight percent of phenyl mercuric isobutyrate in the solution was calculated. All three solutions were stable at room temperature for 15 days. Results of these examples are presented in Table II.

*Examples 22 and 23*

Phenyl mercuric isobutyrate was dissolved in propylene glycol and mineral spirits to prepare 50% by weight solutions at 50° C. The solutions were then cooled to room temperature and filtered. After standing for several days at room temperature, the solutions were again refiltered to remove crystallized minerals, the clear solutions were analyzed for mercury content, and the percent of phenyl mercuric isobutyrate present in each solution was calculated. Both of these solutions were stable at room temperature for 15 days. Results of these examples are set forth in Table II.

*Examples 24–28*

Phenyl mercuric n-butyrate was dissolved in methanol, acetone, propylene glycol, naphtha and mineral spirits to prepare 30–50% by weight solutions at temperatures of from 40–80° C. The solutions were cooled to room temperature, filtered, allowed to stand for several days at room temperature, and refiltered. The clear solutions were analyzed for mercury content, and the weight percent of phenyl mercuric n-butyrate present in the solutions was calculated. All the solutions were stable at room temperature for 15 days. Results of these examples are presented in Table II.

TABLE II.—PERCENT SOLUBILITY BY WEIGHT OF $C_4$ PHENYL MERCURIC SALTS

| Compounds | Methanol | Acetone | Propylene glycol | Naphtha | Mineral spirits |
|---|---|---|---|---|---|
| Isobutyrate | 50.0 | 50.0 | 43.3 | 50.0 | 20.1 |
| n-Butyrate | 28.7 | 38.0 | 11.1 | 6.3 | 1.6 |

*Examples 29–34*

Three separate, five gram samples of phenyl mercuric 2-ethyl hexanoate were agitated at room temperature for 2 hours with 100 gram samples of aqueous ammonia in which the percent ammonia was 0.5%, 1.25% and 2.5%, respectively. The resulting suspensions were filtered, the filtrates analyzed for mercury, and the percent phenyl mercuric 2-ethyl hexanoate was calculated.

The procedure was then repeated with phenyl mercuric n-octanoate. The results of these tests appear in Table III.

TABLE III

| Phenyl mercuric compound | Percent | | | | | |
|---|---|---|---|---|---|---|
|  | $NH_3$ | Compound | $NH_3$ | Compound | $NH_3$ | Compound |
| 2-ethyl hexanoate | 0.5 | 1.95 | 1.25 | 2.91 | 2.5 | 4.0 |
| n-Octanoate | 0.5 | 1.25 | 1.25 | 1.3 | 2.5 | 1.3 |

*Examples 35–40*

The procedure of Examples 29–34 was repeated with phenyl mercuric isobutyrate and with phenyl mercuric n-butyrate. The results of these tests are presented in Table IV.

TABLE IV

| Phenyl mercuric compound | Percent | | | | | |
|---|---|---|---|---|---|---|
|  | $NH_3$ | Compound | $NH_3$ | Compound | $NH_3$ | Compound |
| Isobutyrate | 0.25 | 1.5 | 1.25 | 3.7 | 2.5 | 3.7 |
| n-Butyrate | 0.25 | 1.5 | 1.25 | 4.2 | 2.5 | 4.5 |

When tested in accordance with the procedure described in Conkey, J. H., and Carlson, John A., "Relative Toxicity of Disinfectant Available for Use in the Pulp and Paper Industry" 1956 Supplement, Institute of Paper Chemistry, Appleton, Wisconsin, 1956, phenyl mercuric 2-ethyl hexanoate and phenyl mercuric isobutyrate prepared as described herein were found to be at least as effective as phenyl mercuric acetate when used as a bactericide and/or fungicide against the most common contaminants encountered in the paper industry, i.e., *Aerobacter aerogenes, Bacillus mycoides, Aspergillus niger* and *Penicillium*.

While the preferred solvents for the preparation of solutions are xylene and the alkoxy ethanols, solutions can also be prepared with water; hydrocarbons, such as naphtha, mineral spirits and other petroleum distillates, kerosene, heavy lubricating oil, benzene, and toluene; glycols such as ethylene glycol and its ethers and esters; various solvents for linseed oil and oleo-resinous materials such as turpentine, pine oil and the like; aliphatic and aromatic esters such as ethyl acetate, propionate and benzoate, benzyl benzoate and the like; ketones such as acetone, methyl ethyl ketone, etc.; and halogenated solvents such as chloroform, carbon tetrachloride, ethylene chloride, and chlorobenzene. Mixtures of various solvents may also be employed such as xylene-naphtha, toluene-mineral spirits, and the like.

The compounds of this invention or the concentrated solutions containing the same are each readily incorporated into paints or other coating compositions in order to impart bactericidal activity thereto. The specific amount of the compounds or solutions that should be used depends upon the particular paint or composition and the purpose for which it is to be used. It has been found that excellent results are obtained from salt additions to a paint or coating composition to provide therein a mercury equivalent in the range of from about 0.1 to about 5 percent by weight. For most purposes, a one percent by weight mercury content is adequate.

What is claimed is:

1. Phenyl mercuric salts of saturated branched chain aliphatic monocarboxylic acids wherein said acids contain from 4 to 18 carbon atoms.

2. The salt of claim 1 wherein the carboxylic acid contains 8 carbon atoms.

3. Phenyl mercuric 2-ethyl hexanoate.

4. Phenyl mercuric isobutyrate.

References Cited by the Examiner

UNITED STATES PATENTS

| | | | |
|---|---|---|---|
| 1,993,776 | 3/1935 | Engelmann et al. | 260—414 |
| 2,097,339 | 10/1937 | Patterson et al. | 134—26 |
| 2,114,011 | 4/1938 | Andersen | 260—434 |
| 2,181,098 | 12/1939 | Perkins | 260—434 |
| 2,692,204 | 10/1954 | Nowak | 260—434 |
| 2,991,183 | 7/1961 | Lederer et al. | 106—18 |

HELEN M. McCARTHY, *Primary Examiner.*

TOBIAS E. LEVOW, *Examiner.*

H. M. S. SNEED, *Assistant Examiner.*